United States Patent [19]

Perkins

[11] Patent Number: 5,696,600
[45] Date of Patent: Dec. 9, 1997

[54] MODEM DEVICE FOR USE WITH A FACSIMILE MACHINE COMBINED WITH A PC

[75] Inventor: John Leslie Perkins, St Kilda, Australia

[73] Assignee: Exfax Technologies Pty Ltd, Australia

[21] Appl. No.: 351,509

[22] Filed: Dec. 7, 1994

Related U.S. Application Data

[63] Continuation-in-part of Ser. No. 170,289, filed as PCT/AU93/00247 May 27, 1993, Pat. No. 5,452,106.

[30] Foreign Application Priority Data

| May 27, 1992 | [AU] | Australia | AUPL2631 |
| Dec. 31, 1992 | [AU] | Australia | AUPL6629 |
| Jan. 10, 1994 | [AU] | Australia | PM3286 |
| May 6, 1994 | [AU] | Australia | PM5454 |

[51] Int. Cl.⁶ .................................................... H04N 1/32
[52] U.S. Cl. .................... 358/442; 358/468; 379/100
[58] Field of Search ............... 358/400, 434–436, 358/442, 444, 468; 379/93, 96–98, 100; 375/220, 222; H04N 1/32

[56] References Cited

U.S. PATENT DOCUMENTS

| 4,652,933 | 3/1987 | Koshiishi | 358/256 |
| 4,802,204 | 1/1989 | Chang | 379/100 |
| 4,816,911 | 3/1989 | Kirsch et al. | 358/256 |
| 4,827,349 | 5/1989 | Ogata et al. | 358/256 |
| 4,850,008 | 7/1989 | Berg et al. | 379/93 |
| 4,910,506 | 3/1990 | Yoshida et al. | 340/825.07 |
| 4,910,607 | 3/1990 | Kita et al. | 358/400 |
| 4,914,688 | 4/1990 | Kobayashi et al. | 379/93 |
| 4,964,154 | 10/1990 | Shimotono | 379/100 |
| 4,991,200 | 2/1991 | Lin | 379/100 |
| 5,020,096 | 5/1991 | Sakakibara et al. | 379/100 |
| 5,062,133 | 10/1991 | Melrose | 379/94 |
| 5,065,427 | 11/1991 | Godbole | 358/400 |
| 5,127,048 | 6/1992 | Press et al. | 379/100 |
| 5,196,943 | 3/1993 | Hersee et al. | 358/403 |
| 5,227,893 | 7/1993 | Ett | 358/400 |
| 5,289,582 | 2/1994 | Hirata et al. | 395/275 |
| 5,452,106 | 9/1995 | Perkins | 358/434 |

FOREIGN PATENT DOCUMENTS

| 4070385 | 3/1985 | Australia . |
| 0212199 | 3/1987 | European Pat. Off. . |
| 0291307 | 11/1988 | European Pat. Off. . |
| 0426412 | 5/1991 | European Pat. Off. . |
| 1168161 | 2/1983 | Japan . |
| 59-224964 | 4/1984 | Japan . |
| 1168160 | 7/1989 | Japan . |
| PCTUS90/01065 | of 0000 | WIPO . |
| 9110309 | 3/1983 | WIPO . |
| 9325041 | 12/1993 | WIPO . |

*Primary Examiner*—Kim Vu
*Attorney, Agent, or Firm*—Biebel & French

[57] ABSTRACT

A modem device for connecting with a facsimile transceiver and a computer, and with a telephone network is disclosed. The device has two modes of operation: a computer mode where the computer can communicate with the telephone network and also receive calls from the facsimile transceiver, and a facsimile machine mode where the facsimile machine can communicate with the telephone network and receive calls from the computer. The device also has a memory or buffer so that for outgoing calls, the facsimile transceiver can send the facsimile data thereto at a local facsimile rate whereupon it can be relayed to the telephone network at a remote facsimile rate higher than the local rate and incoming calls, to receive the facsimile data thereto at a remote facsimile rate whereupon it can be relayed to the facsimile transceiver at the local facsimile rate, the relaying being at the same time as the sending or receiving of the facsimile data. This procedure can save call time on the telephone network.

19 Claims, 13 Drawing Sheets

MODE 1

MODE 2

MODEM DEVICE FOR USE WITH A FACSIMILE MACHINE COMBINED WITH A PC

RELATED APPLICATIONS

This application is a continuation-in-part application of U.S. patent application Ser. No. 08/170,289 filed Dec. 30, 1993 as a U.S. National Phase application of International application PCT/AU93/000247 filed May 27, 1993, now U.S. Pat. No. 5,452,106 issued Sep. 19, 1995.

This present invention relates to a device for connecting a fax machine to a telephone network. The device may also be connected to a computer. The device provides additional features for selectively connecting a computer directly to a fax machine, and for automatically routing incoming telephone calls to either the fax machine or the computer. The device also provides additional capabilities, including higher speed capabilities, for communication with a remote fax machine.

The text of U.S. patent application Ser. No. 08/170,289 is set out below:

TITLE

A Facsimile Device

1. Technical Field

The present invention relates to a facsimile device for connecting a facsimile transceiver to a computer. The facsimile device may also be connected to a telephone network.

2. Description of the Prior Art

According to the prior art it is known to have facsimile modems and data modems for performing facsimile transmission of documents or file transfers using facsimile protocols. Such devices may be either internal or external devices which can be connected to computer provided with the appropriate software. However, such devices may not be easily interconnected with an existing facsimile transceiver at the same local site. Prior art devices provide only for connection to a facsimile device at a remote site over a telephone network. Therefore, any connection between the computer and the local facsimile transceiver is only possible via the telephone network. In such a case, a telephone exchange and telephone lines are required to communicate between the computer and the facsimile transceiver.

BACKGROUND TO THE INVENTION

In order to describe the scope of the current invention it is desirable to briefly outline the operational procedures of facsimile communications and the incorporation of file transfer within these procedures. This may be done with reference to the five Phases in a facsimile transmission:

Phase A is the call establishment and line connection of equipment,

Phase B is the pre-message signalling and capability selection,

Phase C is the facsimile message transfer,

Phase D is the post-message signalling, and

Phase E is the call disconnection.

In particular Phase B is the low speed (300 baud) pre-message signalling in which the capabilities of the respective machines are indicated and selected. In particular the called station first responds with a Digital Information Signal (DIS) in which its capabilities in terms of group type, speed, resolution, and other special capabilities are indicated. At this time file transfer capabilities my also be indicated. The calling machine then responds with a Digital Command Signal (DCS) in which, in line with its own capabilities, the capabilities required for the forthcoming transmission are selected. This is followed by a high speed training sequence related to synchronisation, equalisation and other functions.

When the receiving machine indicates its readiness to receive, Phase C is entered during which the transfer of facsimile information takes place. At this time the transmitting machine will progressively scan the input document, code and compress the pixel information according to the selected resolution and transmit the information at the selected speed. The receiving machine will correspondingly decompress and decode the received information and print the required image.

At the completion of each page, Phase D is entered. This post-message signalling determines if there are more pages to transmit, in which case Phase C is repeated. If there are no more pages then Phase E is entered at which time the call is terminated and the line disconnected.

It is necessary to refer to recent modifications to the standards for facsimile telecommunications as determined by the Study Group VIII of the CCITT. These allow for improvements in speed, resolution, network addressing procedures and also for file transfer to be accomplished as an alternative facsimile data type.

The procedures for non-facsimile image data transfer within the facsimile call are defined in modifications and appendices to the CCITT Recommendations T.4 and T.30 which govern facsimile telecommunications. In particular the file transfer modes permitted are:

(a) Basic Transfer Mode (BTM), (b) Document Transfer Mode (DTM), (c) Binary File Transfer (BFT), and (d) Edifact transfer.

Of these, BFT is considered most general and most suitable for widespread application for PC compatible communications. This is because the binary file mode allows the transfer of any type of file including those indicated by the other modes. The first two transfer modes are more appropriate for integration with telex or similar communications, whereas the fourth relates specifically to the standard form for electronic data interchange for administration commerce and transport (EDIFACT).

Whereas for the following description of the preferred embodiments of the present invention, the binary file transfer mode will be most relevant, the preferred embodiments may include equipment which is capable of transceiving file information in any of the above modes and interfacing with equipment which is designed specifically for the transception of information in any of the above file transfer modes.

File transfers may be affected, with a compatible receiver, by making the appropriate DCS selection in Phase B. This may be after the completion of a normal facsimile transfer in Phase C. In this case, Error Correction Mode (ECM) will also be selected to guarantee data integrity.

File transfer will take place in Phase C according to the BFT or other selected file transfer mode.

In the case of a facsimile device for a personal computer, the file or files selected for transfer, and those received will normally reside on the hard disk or floppy disk of the personal computer, according to the user's specification. In the case of non-computer based devices, the files for transception will normally reside on a floppy disk.

With all facsimile devices the facility may exist for the calling device to receive facsimile information from a remote called device which has a document to transmit (polling). This facility is also relevant for file transfers, as per CCITT Recommendation T.30.

STATEMENT OF THE INVENTION

According to the present invention there is provided a facsimile device for local facsimile/computer interconnection, comprising at the local site:

i) a first termination means for direct connection of a facsimile transceiver, ii) a second termination means for direct connection of a computer, iii) first communication means for communicating with the facsimile transceiver via said first termination means, iv) second communication means for communication with the computer via said second termination means, and v) control means for controlling the first communication means and the second communication means, wherein data signals are capable of being communicated from the facsimile transceiver to the computer or from the computer to the facsimile transceiver such that, at the local site, the facsimile transceiver can act as a printer for the computer and where the facsimile transceiver can act as a scanner for the computer.

According to the present invention there is further provided a method of printing using the above device comprising the steps of:

connecting a facsimile transceiver to the first termination means of the device, connecting a computer to the second termination means of the device, establishing communications between the computer and the facsimile transceiver via the device, sending data signals from the computer to the facsimile transceiver, and printing the data in the data signals on the facsimile transceiver.

According to the present invention there is further provided a method of scanning a document using the above device comprising the steps of:

connecting a facsimile transceiver to the first termination device of the device, connecting a computer to the second termination device of the device, establishing communications between the computer and the facsimile transceiver via the device, scanning a document on the facsimile transceiver, sending data signals representing the scanned document from the facsimile transceiver to the computer.

BRIEF DESCRIPTION OF THE DRAWINGS

Preferred embodiments of the present invention will hereinafter be described, by example only, with reference to the accompanying drawings in which.

DETAILED DESCRIPTION OF THE PREFERRED EMBODIMENTS

Figure 1:
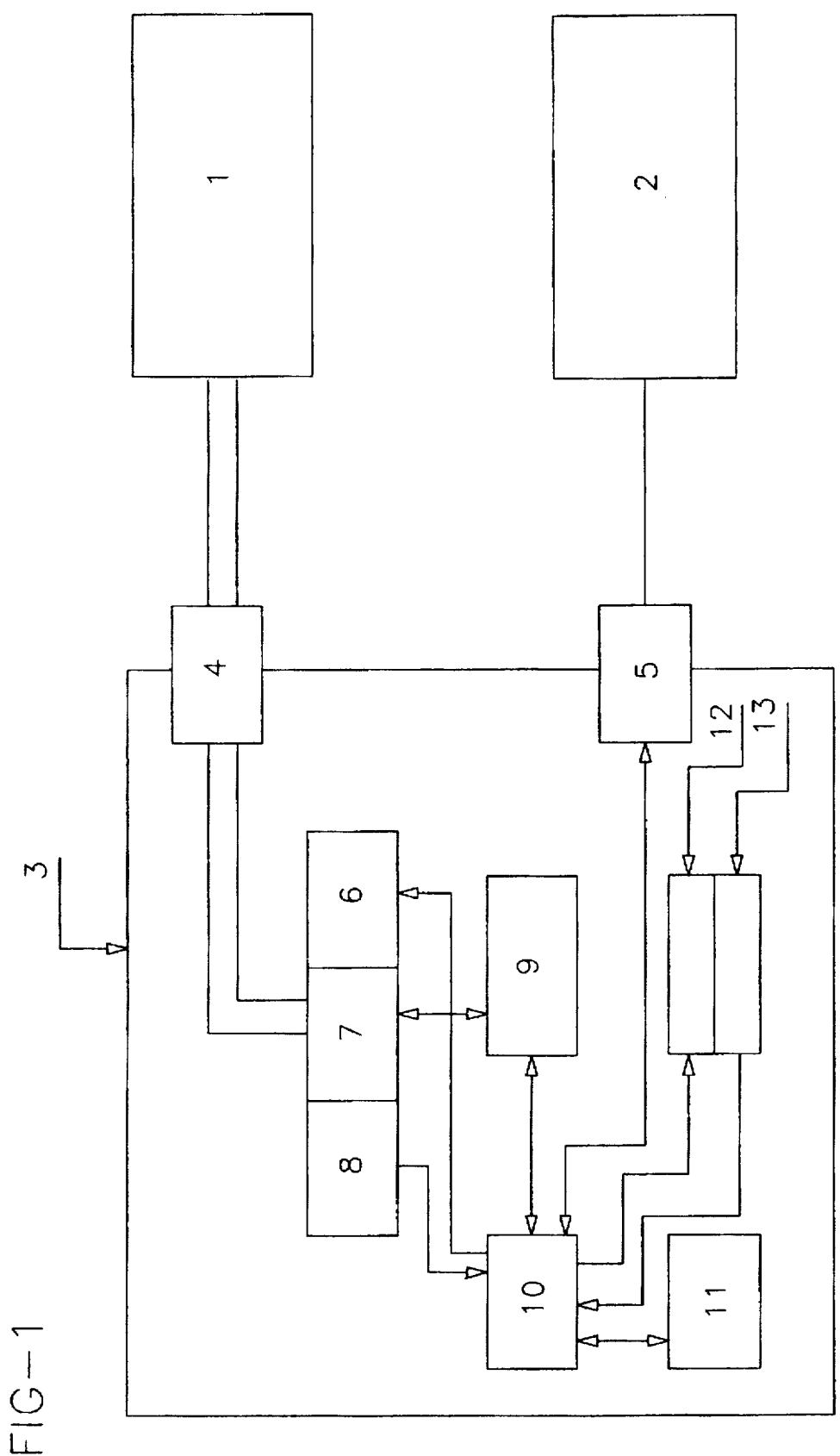
FIG. 1 illustrates a first preferred embodiment of the present invention.

FIG. 1 illustrates a local communications facsimile device 3 for local facsimile to computer interconnection. The device 3 is provided with a first termination means comprising connector 4 and a second termination means comprising a serial port connector 5. Connector 4 is preferably a PSTN-type connector for connection to the connector of the facsimile transceiver 1. A facsimile transceiver 1 can be directly connected to the connector 4 and a computer can be directly connected to the serial port connector 5 at a local site. The facsimile transceiver 1 and the computer 2 are thus connected to each other using the device 3.

The device 3 is further provides a first communications means having a ring generator means comprising ring generator 6, a first line interface means comprising line interface unit 7, and a first detector means comprising a line loop detector 8. The ring generator 6, line interface unit 7 and line loop detector 8 are connected to the connector for communication with the facsimile transceiver 1. There is further provided a control means comprising microprocessor 10 which is connected to the ring generator 6 and the line loop detector 8. A modem 9 is connected between the line interface unit and the microprocessor 10. The microprocessor 10 is also connected to a second communications means which includes the serial port connector 5 for communication with the computer 2. The microprocessor 10 may be provided with system memory 11 for storing communication information and a control program for the microprocessor 10. The device 3 may also be provided with a display 12 for communicating information to the user and a keypad 13 to provide the user with control of the device 3.

In use, the device 3 may be used to connect the computer 2 to a facsimile transceiver 1 to serve as a printer for the computer 2. When the computer 2 wishes to print to the facsimile transceiver 1, the computer 2 sends a printing request signal to the microprocessor 10 requesting the device 3 to establish communication with the facsimile transceiver 1 for the purposes of printing. Microprocessor 10 then sends a ring request signal to the ring generator 6 which produces a ring signal to the facsimile transceiver 1 via the connector 4. When the facsimile transceiver 1 answers the ring signal the line loop detector 8 detects the answer which is communicated to the microprocessor 10. The microprocessor 10 establishes communication between the device 3 and the facsimile transceiver 1 by exchanging communication protocol information according to Phase B as set out hereinbefore.

The microprocessor 10 then proceeds to receive the information to be printed from the computer 2 and forwards the serial data from the computer 2 to the modem 9. The modem 9 modulates the data and forwards the modulated data to the line interface unit 7. The line interface unit 7 then sends the modulated data to the facsimile transceiver 1 via the connector 4.

The facsimile transceiver 1 thus prints the data communicated from the computer 2 and once all the information has been transferred the microprocessor 10 indicates to the facsimile transceiver 1 that communications are completed and the microprocessor 10 terminates the data transfer from the computer 2 to the facsimile transceiver 1.

The facsimile transceiver 1 may also be used as a scanner for scanning documents and communicating the scanned documents to the computer 2. When using the facsimile transceiver 1 as a scanner, a number is dialled on the facsimile transceiver 1 as if the user requires to send a facsimile. The line loop detector 8 detects the dialling function of the facsimile transceiver 1 and the microprocessor 10 is readied for receiving a facsimile transmission from the facsimile transceiver 1. The microprocessor 10 answers the facsimile transceiver 1 using modem 9 and line interface 7. Communication is established between the microprocessor 10 and the facsimile transceiver 1 by exchanging the normal facsimile communication protocol information.

Once communication is established, the facsimile transceiver 1 sends modulated signals representing the scanned documents via the connector 4 to the line interface unit 7 and to the modem 9 where the modulated signals are demodulated. The demodulated signals are communicated from the modem 9 to the microprocessor 10. The microprocessor 10 can then transfer the demodulated signals representing the scan documents to the computer 2 via the serial port connector 5. Again, once facsimile transmission is completed the microprocessor 10 disconnects from the facsimile transceiver 1 and the computer 2.

The operation of the device 3 can be controlled via the display 12 and the key pad 13.

The microprocessor 10 is under control of a program stored in the system memory 11. The memory 11 may also be used as a buffer to temporarily store information transferred between the computer 2 and the facsimile transceiver 1 is either of the devices are disconnected.

Figure 2:
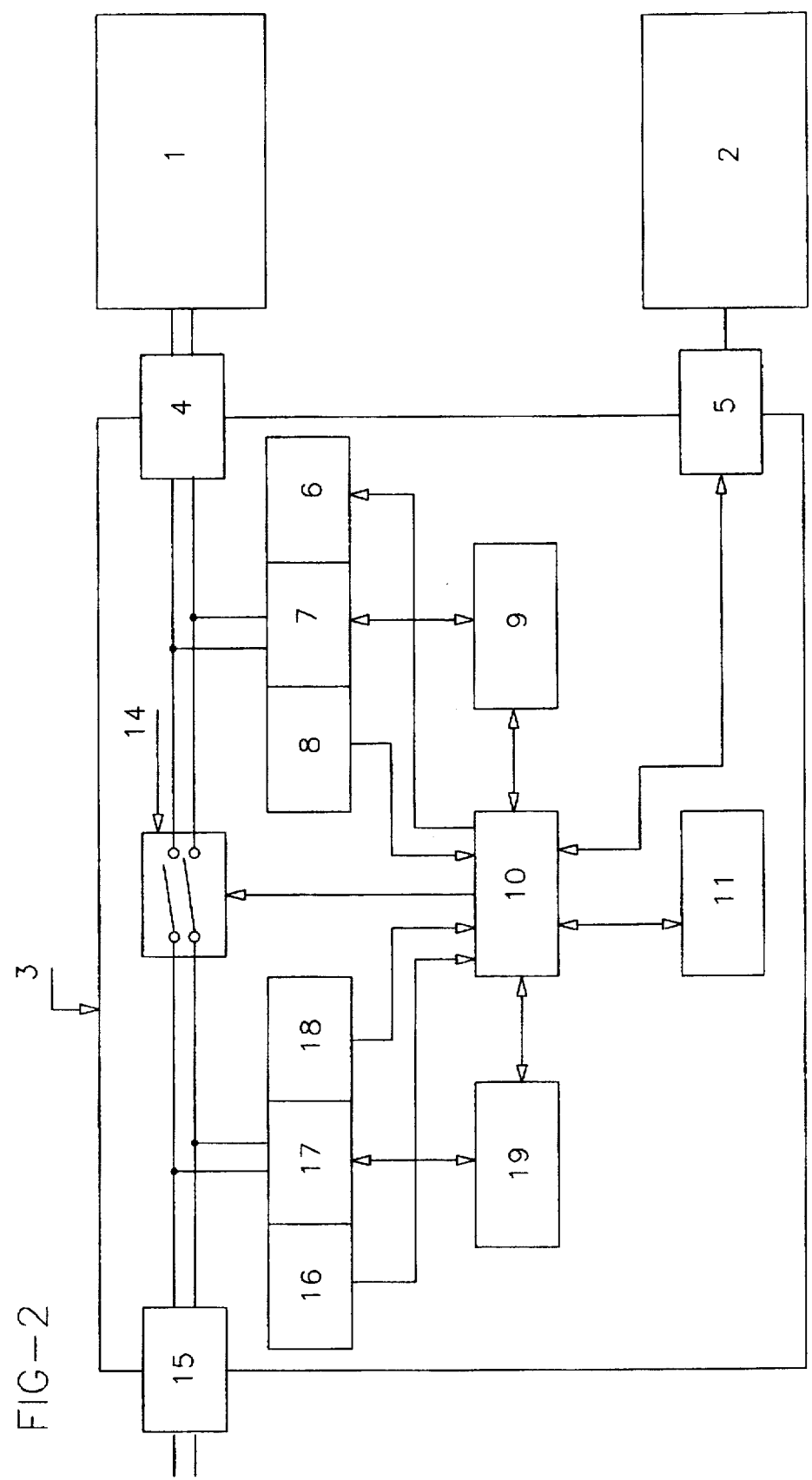
FIG. 2 illustrates a second preferred embodiment of the present invention.

FIG. 2 illustrates another preferred embodiment of the present invention which is provided with a third communication means for connecting the device 3 to a telephone network. The third communications device is comprised of a PSTN connector 15, a ring detector 16, a line interface unit 17, a line loop detector 18 and a modem 19. Using these features it is possible for the computer 2 to use device 3 as a standard modem for communicating with other devices at remote sites via the telephone network. The ring detector 16 detects a ring signal which comes in via the PSTN connector 15 if another device tries to contact the device 3. The ring detection signal is transmitted to the microprocessor 10 which then establishes communication with the other device via the line interface unit 17 and the modem 19. Upon completion of the communication, the line loop detector 18 detects where the other device disconnects or hangs up the telephone connection and communication with the device 3 is disconnected. The device shown in FIG. 2 can thus be used by the computer 2 as a normal data modem or facsimile modem for communicating with another device via PSTN connector 15. The device 3 may also be set such that any incoming calls are answered by the microprocessor 10 and directed to the computer 2.

A switch device 14 may be provided to connect the PSTN connector 15 to the connector 4 under the control of microprocessor 10. The device 3 can thus be set by the user such that switch 14 is closed and any incoming calls are automatically directed from the telephone network to the facsimile transceiver 1 via the switch 14. Similarly, the facsimile transceiver 1 can transmit a facsimile directly to the telephone network via switch 14. Alternatively, switch 14 may be open such that all incoming calls are firstly directed to microprocessor 10 which is then able to redirect the call either to the facsimile transceiver 1 or the computer 2. Similarly, either the facsimile transceiver 1 or the computer 2 may send facsimile information via the telephone network through the microprocessor 10. When transmitting a facsimile to or from the facsimile transceiver via the microprocessor 10, enhanced capabilities of the device 3 may be used for improved communication. For example, if the device 3 is able to transmit at higher speeds than that of the facsimile transceiver 1, the device 3 can be used to accelerate communication. Alternatively, the device 3 may be provided with Error Correction Mode and file transfer capabilities which thus augments the facilities provided by the facsimile transceiver 1 and the computer 2.

The microprocessor 10 may also perform any buffering of data in memory 11 in order to maintain synchronisation between the local and remote devices.

If a file transfer is required, the transfer is effected by the microprocessor 10 in conjunction with an optional floppy disk drive which can be provided in the device 3. The files contained on the disk in the disk drive can then be transferred via the modem according to known file transfer procedures. On completion of the transmission and confirmation of a error free reception of the information, the call is terminated. Alternatively, the file transfer may be directed to the computer 2 for storage on the disk drive of the computer.

The device shown in FIG. 2 may also be used similarly to the device shown in FIG. 1 to allow the facsimile transceiver 1 to be used as a printer or a scanner. In such a mode of operation the connection 15 to the telephone network is disconnected.

Figure 3:
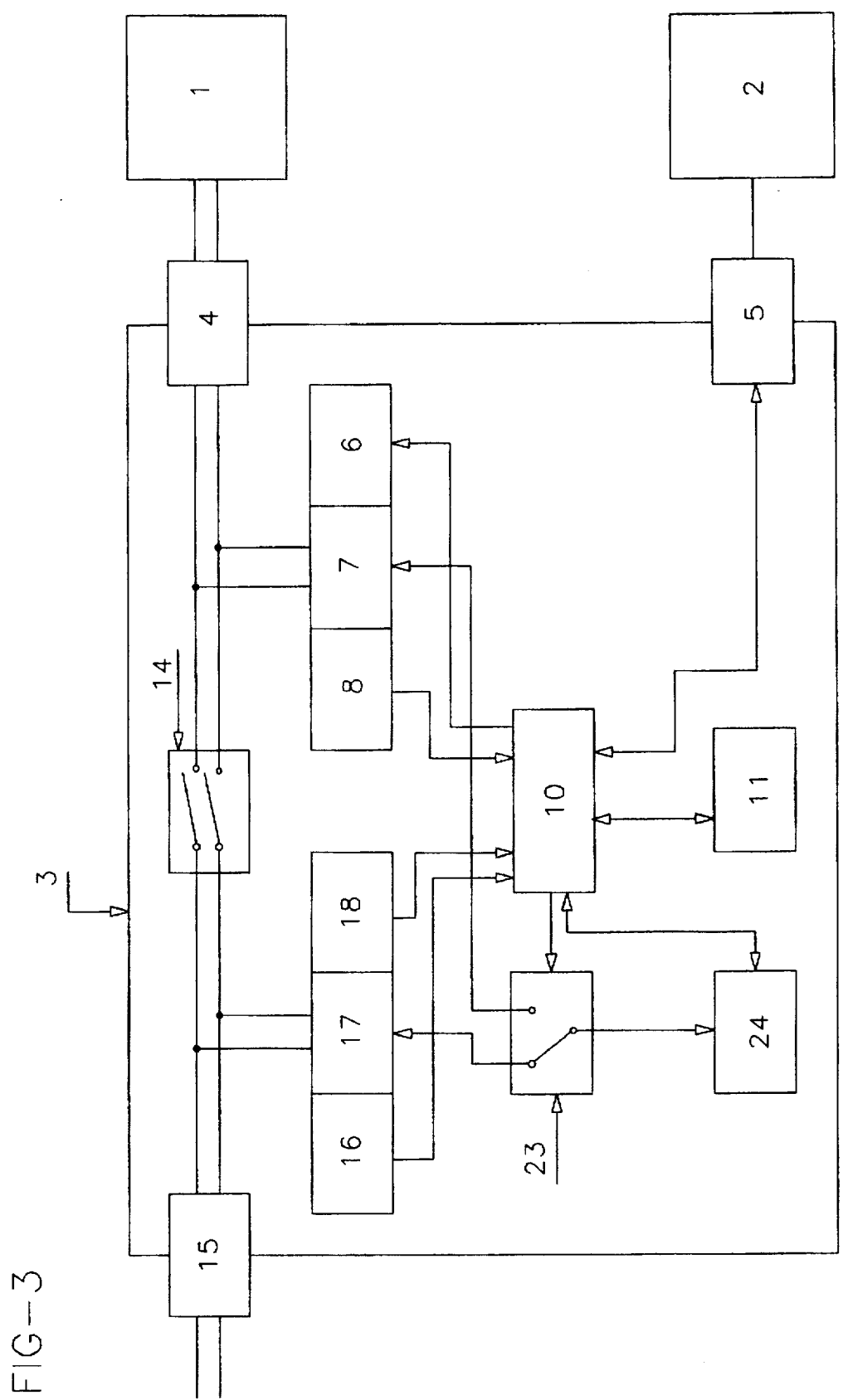
FIG. 3 illustrates a third preferred embodiment of the present invention.

FIG. 3 is another preferred embodiment of the present invention illustrating a device 3 similar to that of FIG. 2. Like features have been numbered using the same reference numerals. However, instead of having a modem 9 and a modem 19 as shown in FIG. 2, the device 3 shown in FIG. 3 has a modem 24 and a switch 23. The modem 24 is used to perform the same role as the modems 9 and 19 of FIG. 2 by switching the switch 23 to connect the modem either to the facsimile transceiver 1 or the telephone network. This embodiment reduces the cost of the device since only 1 modem component is required. In this case the local modem capabilities of the device enabling it to connect to both the external telephone line and the facsimile transceiver are achieved by switching the modem to the appropriate line. With this device, rerouting of facsimile data within one call session is not possible.

Figure 4:
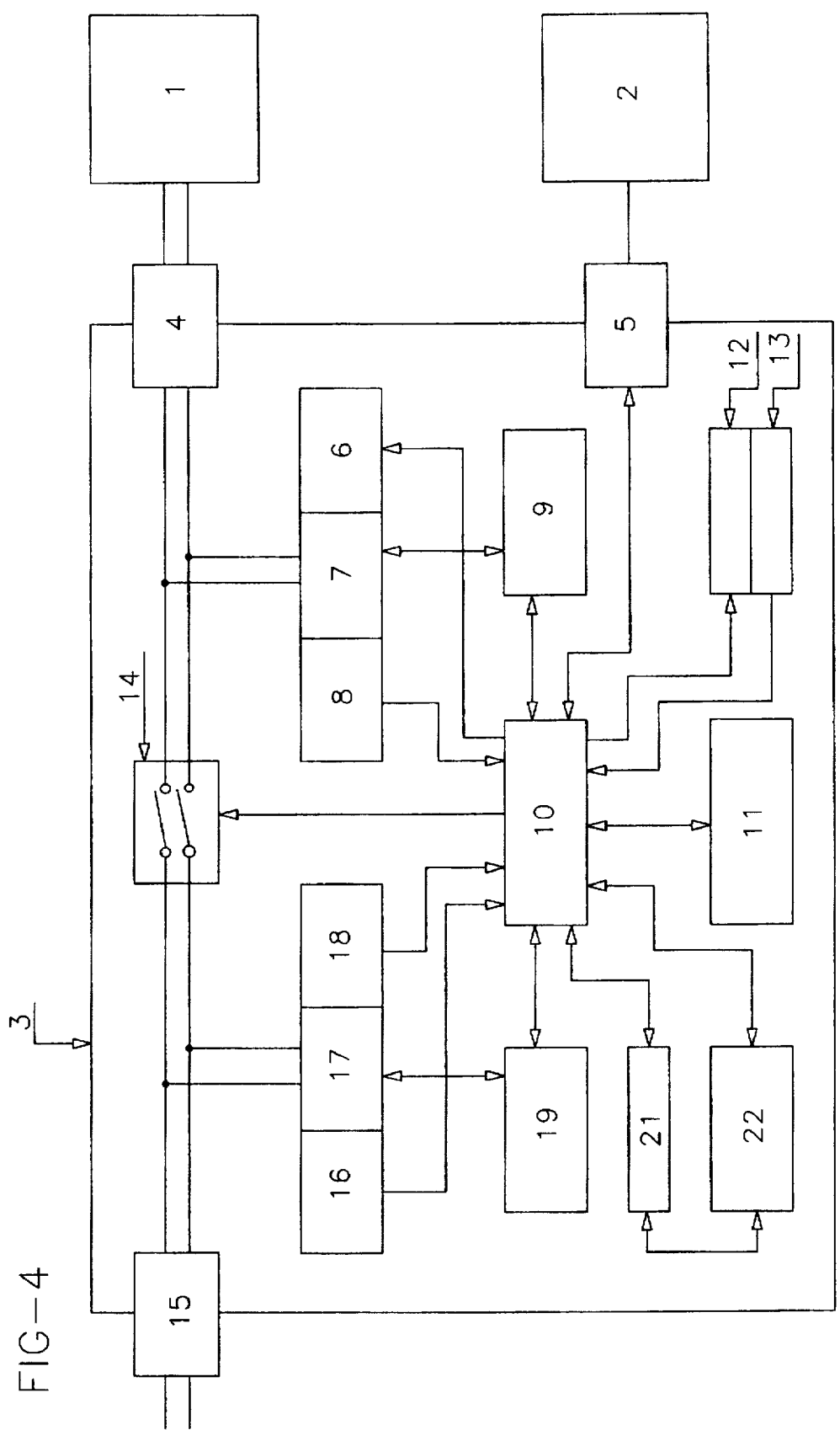
FIG. 4 illustrates a fourth preferred embodiment of the present invention.

FIG. 4 illustrates another preferred embodiment of the present invention similar to the preferred embodiment shown in FIG. 2. Like features have been numbered using similar reference numerals. However, the embodiment shown in FIG. 4 is further provided with a disk drive 21 and a disk controller 22 for controlling the disk drive 21. The disk drive 21 may be used for file transfer using the modified CCITT Recommendations T.4 and T.30 governing facsimile communication including file transfers using facsimile protocols. When requiring a file transfer using the device 3, a disk is inserted in the disk drive 21 and the key pad 13 is operated to indicate to the device 3 that the data stored on the disk can be transmitted from the device 3 to a remote location via the telephone network connected to PSTN connector 15. Similarly, when a transmission is received by the device 3 from the telephone network via PSTN connector 15, file transfer information may be directed to the disk drive 21 if the device 3 has been set to transfer such file information to the disk drive 21. Alternatively, file information may be sent to the personal computer 2, depending on the modes set on the facsimile device.

There are three operations in which the device 3 may be used. These include:

(a) sending a facsimile from the facsimile transceiver 1, (b) sending a facsimile from the computer 2, and (c) receiving a facsimile transmission from a remote location via the telephone network.

The behavior of the device, in terms of the routing of information is determined in each case by the current operating mode of the device.

These various Operating Modes of the device may be selected by the user via a special AT command set, or by hardware switch. The three Operating Modes of the preferred embodiment of the device are:

(1) PC-fax Mode.

(2) Normal facsimile Mode.

(3) Local Mode.

In the first Mode, the device operates as a facsimile modem in connection to the computer. Communications between the device and the computer are controlled via standard AT command set. Facsimile file conversions and session supervision may be provided by computer software. File transfer capabilities may be implemented by the computer software or provided in conjunction with the disk drive of the device. In this Mode the facsimile transceiver may also be used for sending facsimiles.

In the second operational Mode all incoming facsimiles are directed to the facsimile transceiver. This is the standby mode, when the computer is not in use, enabling the use of all existing functions of the facsimile transceiver. If available however, the computer may also be used to send facsimiles, including file transfers in this Mode.

The third operational Mode allows local communications. In this Mode a facsimile may be sent from the facsimile transceiver to the computer, enabling the facsimile, in conjunction with computer software, to operate as a desktop scanner. Similarly a facsimile may be sent from the computer to the facsimile transceiver, thus enabling the facsimile to be used as a printer.

In its simplest form this device relies on the facsimile transceiver or the computer for dialling functions. Alternatively, the device may incorporate its own dialling facility so that it may operate independently. When not in operation for remote communication it may transmit journal information regarding file transfers to the facsimile transceiver.

Figure 5:
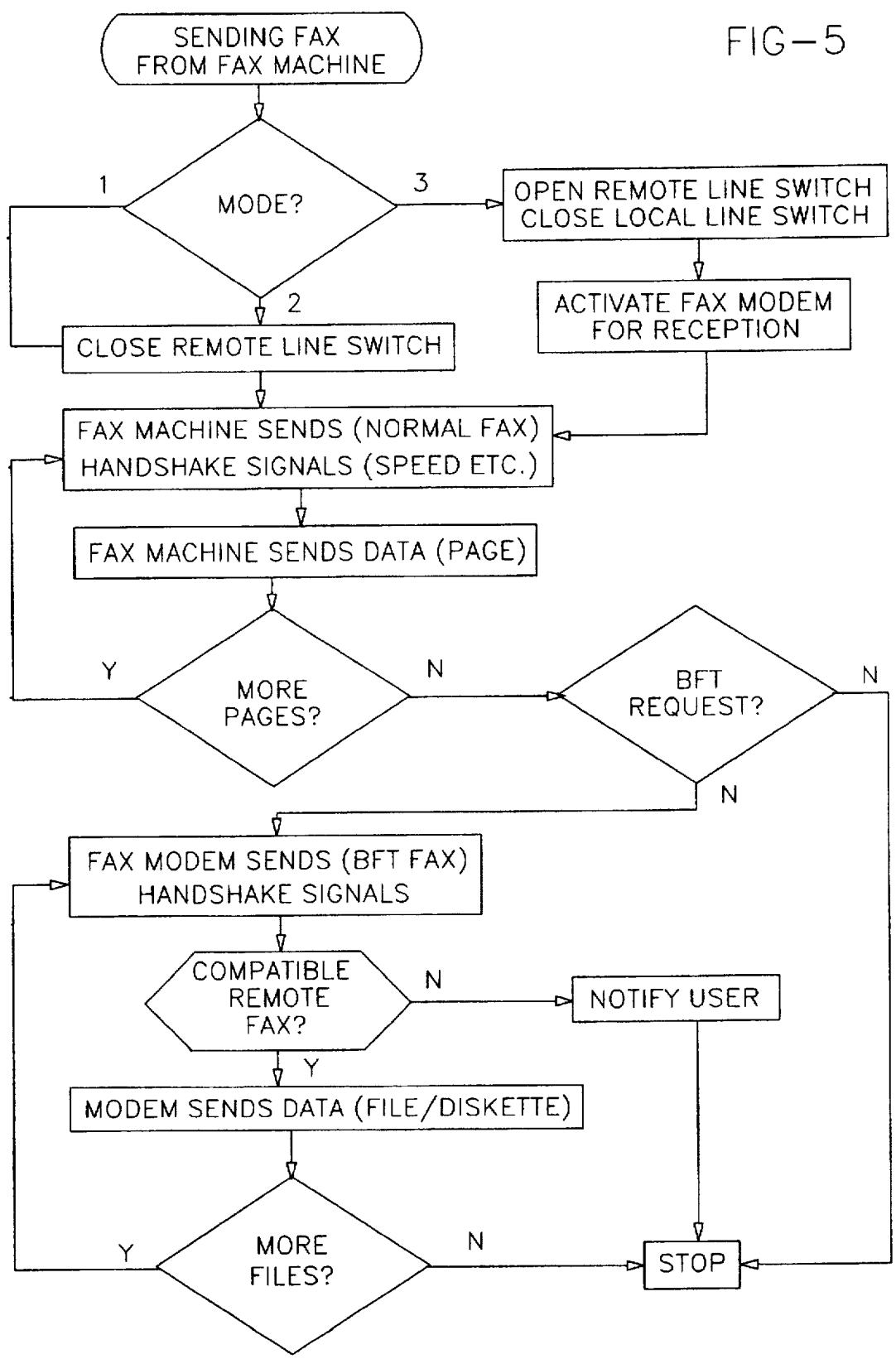
FIG. 5 is a flow diagram illustrating the process of sending a facsimile from the facsimile transceiver.

A flow chart, indicating the operation of the device 3, when a facsimile transmission is initiated from the facsimile transceiver 1 is shown in FIG. 5. In Modes 1 and 2, communication with a remote facsimile is initiated. In Mode 3, communication with the local facsimile transceiver 1 is initiated. In both cases, the call is detected by the ring detector 16 and line interface unit 17. At this time the switch 14 is closed by the microprocessor 10 for the purpose of call establishment.

In the implementation shown in FIG. 5, data is routed directly from the facsimile transceiver 1 to the PSTN connector 15 in the case of modes 1 and 2. When a file transfer is requested, this is performed at the end of a normal facsimile transmission. A file transfer in conjunction with the sending of a facsimile from the facsimile transceiver is facilitated in preferred embodiments of the invention which incorporate a disk drive.

Figure 6:
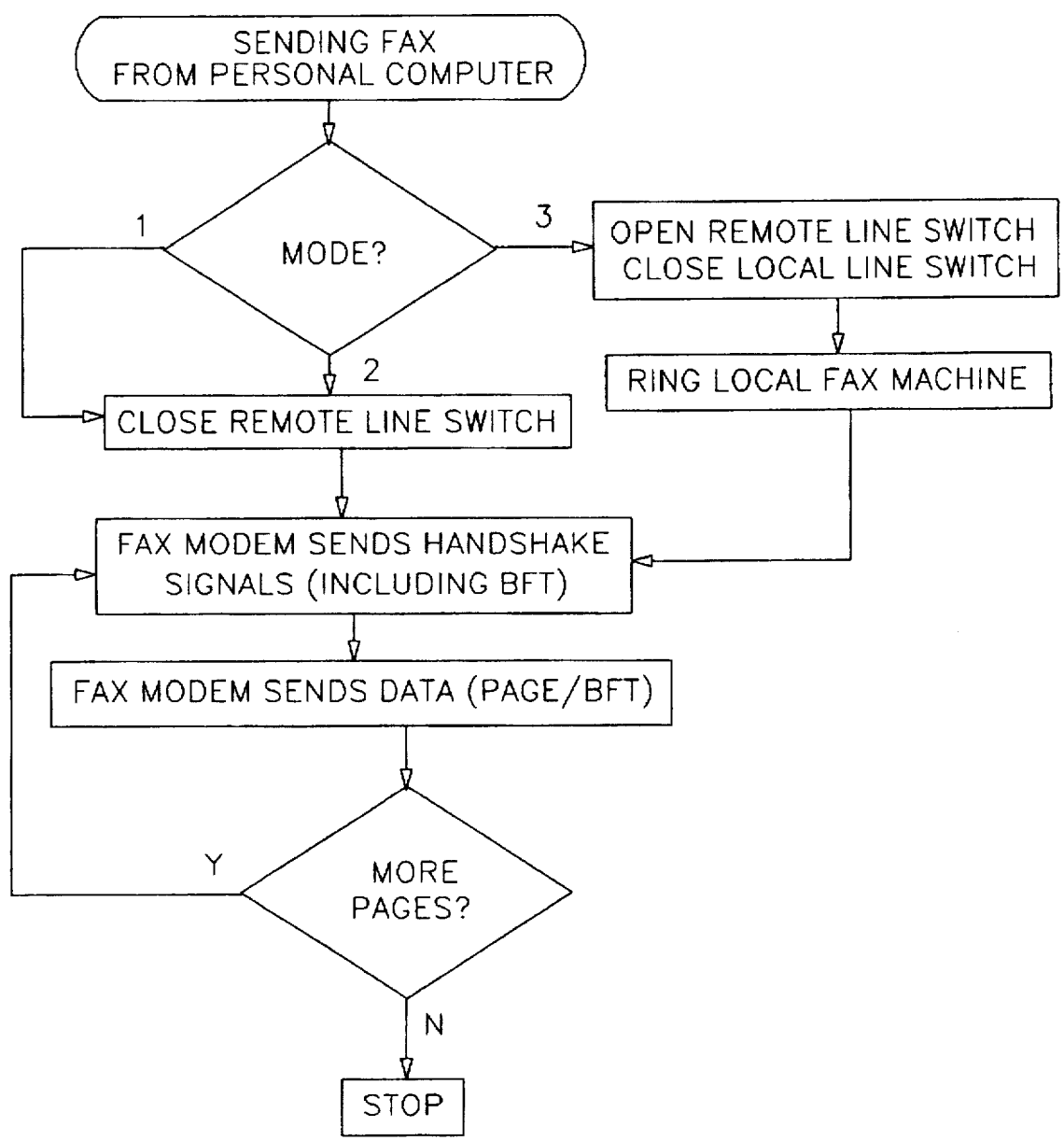
FIG. 6 is a flow diagram illustrating the process of sending a facsimile from the computer.

The operating procedure of the device 3 in sending a facsimile from the computer is shown in FIG. 6. In this case all sending operations are performed in conjunction with the computer 2. In Modes 1 and 2 the facsimile transceiver 1 is kept off line. In Mode 3 the outgoing facsimile is routed to the facsimile transceiver 1, thus providing an effective printing function for computer documents.

Figure 7:
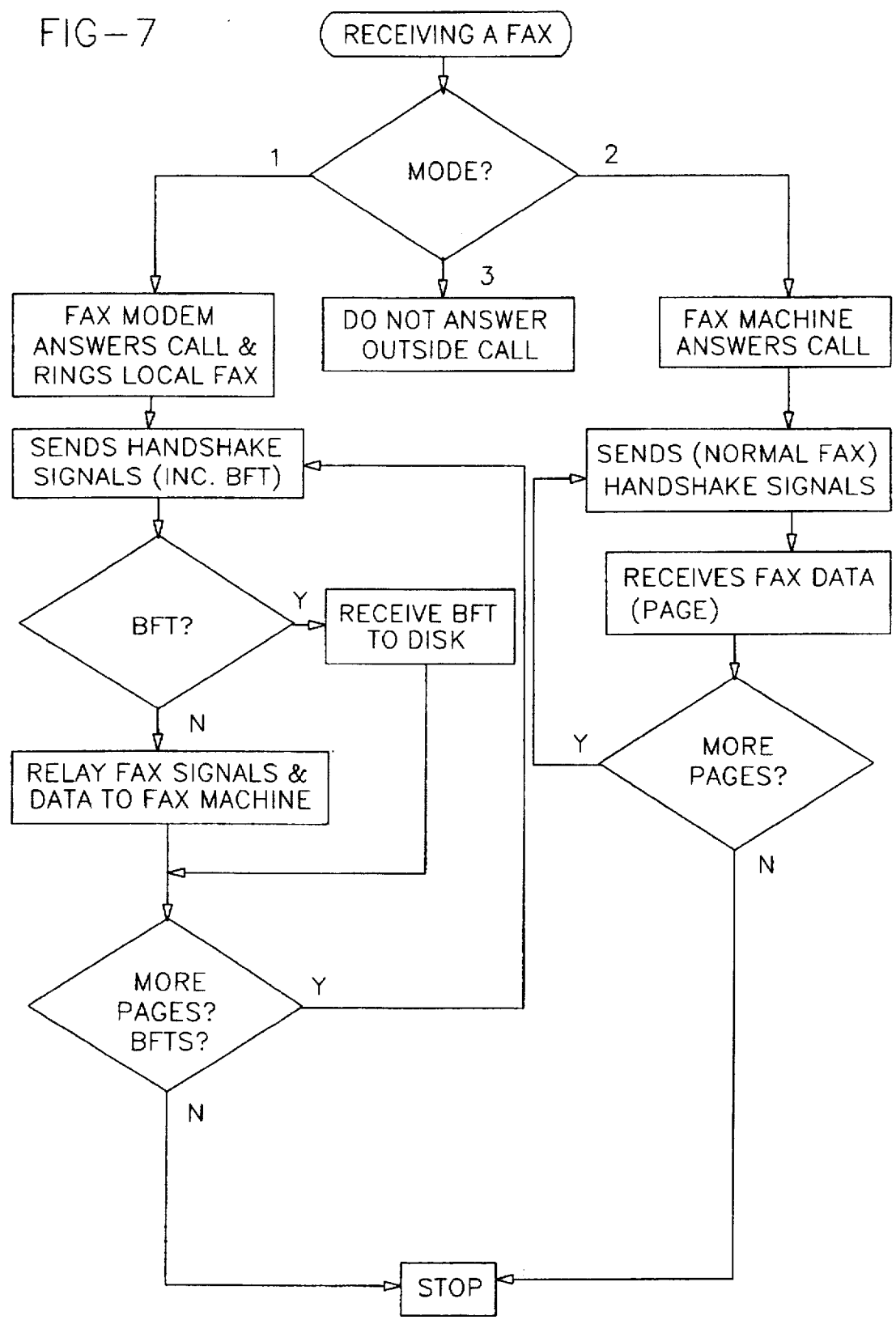
FIG. 7 is a flow diagram illustrating reception of a facsimile transmission.

The operating procedure of the device 3 when receiving a facsimile is shown in FIG. 7. If the device 3 has been configured in Mode 1, the incoming data is routed to the computer 2. In Mode 2, incoming data is routed to the facsimile transceiver 1.

Preferably, where the device contains its own disk drive, file information may be routed to disk and facsimile image data routed to the facsimile transceiver 1. Depending on the particular embodiment of the invention, the routing of data may be further selected by the user via appropriate commands or switches. Error diagnostics and file receive indication are provided by the user interface display.

Alternatively all received data may be optionally directed to the computer. In the case of embodiments not containing a disk drive, the device must be configured in Mode 1 in order to receive file transfers on the computer 2.

As indicated in FIG. 7, when the device 3 is configured for local mode operations, (Mode 3), it is unavailable to receive a facsimile from a remote source, and will not answer an incoming call.

The preferred embodiments may also provide the following facilities:

(a) While file transfers will utilise error correction mode (ECM) it may be necessary to convert data to standard mode for compatibility with existing facsimile transceivers. Alternatively, standard mode for standard facsimiles may be negotiated during the Phase B handshake.

(b) By utilising a store and forward mode, the device 3 may also provide additional facilities such as broadcasting and delayed transmission not possessed by the local facsimile transceiver.

(c) In the event of a breakdown in synchronisation between the local and remote facsimile transceivers, for example due to an out-of-paper condition, the device 3 may alternatively temporarily store facsimile information for later transfer to the facsimile transceiver 1.

(d) if a file transfer is selected for transmission, the device 3 will first check the disk to be facsimiled. The display 12 may indicate to the user the number of files the disk contains and the total number of bytes they comprise, or otherwise indicate a particular not-ready condition. An option may be provided whereby the user may sequentially display file names and mark individual files for transfer. An option may be provided so that subdirectories, where present, are either ignored or transferred.

(e) After a file transfer has been received the device 3 will indicate with a visible signal that a file transfer has taken place since the last operator attention. This will signal to the operator that the disk should be then removed and replaced with another blank formatted disk.

(f) In standby mode, the device may display the number of files and the number of free bytes remaining on the disk.

(g) As multiple transfers from different stations may be received to the same disk, the use of subdirectories to keep such information separate may be selected.

(h) Insufficient disk space on the receiving disk is a particular error condition which would be indicated to operators at each station. This would be handled in a similar way to the out-of-paper condition. Additionally RAM may be provided to store received information until a disk with sufficient free space is provided.

(i) The disk drives and controllers may be standard IBM compatible components. The disk size format (5.25" or 3.5") may thus be left up to the choice of the user. High density disks would be preferred in receive mode.

Further capabilities common to the above devices may also be indicated. In particular it may be optionally selected that a received facsimile image may be both printed and stored into the memory device for later retrieval. File transfer and general data transfer capabilities, not in accordance with the CCITT facsimile standard may also be implemented in the same device.

The above preferred embodiments provide a facsimile device which can be used to connect a facsimile transceiver to a computer for communication between the facsimile transceiver and the computer. The facsimile transceiver can thus be used as a printer or a scanner for the computer. Optionally, the device may be connected to a telephone network, thus enabling communication between the computer or the facsimile transceiver to devices at remote locations. In such a configuration the facsimile devise can operate either as a standard modem or a facsimile modem. In another preferred embodiment file transfers may also be made using facsimile protocols using a floppy disk drive built into the device.

It will be obvious to those skilled in the art that numerous alterations and modifications can be made to the devices encompassing the invention other than those specifically described above without departing from the basic concepts of the invention. For example, the facsimile device may be provided on a card for location in the computer. The card would have a connector for the facsimile transceiver to connect the computer directly to the facsimile transceiver.

All such modifications and alterations are to be considered within the scope of the invention, the nature of which is to be determined from the foregoing description.

Relevant prior art encompasses devices interposing between the telephone line and an existing fax machine. These devices may enable the utilization of advanced fax features such as Error Correction Mode and Binary File Transfer, in conjunction with an existing design fax machine. The device may also connect to a computer, enabling the computer to be used for transception of faxes to a remote fax machine. A local mode of operation may also be provided, so that the fax machine may be used as a printer and a scanner for the PC.

GENERAL DESCRIPTION OF THE PRESENT INVENTION

The present invention generally embraces all of the features of the invention described in the aforementioned U.S. patent application, but with the addition of certain design features not previously disclosed.

In particular, the current invention permits simplification of the operational modes to provide enhanced facilities.

In the aforementioned patent application, three operational modes are required to connect 1. the PC to the telephone line, 2. the fax machine to the telephone line, or 3. the PC to the fax machine. In the present invention these functions may be achieved by use of only two operating modes of the device. This enables cost saving in design, by use of fewer components, and simplifies operation for the user.

In another aspect of the present invention, the device may be used to selectively route incoming calls. In the typical use of the device to share a single telephone line between a fax machine and a PC, both the fax machine and the PC may be used for fax transmissions. However, typically the user may require to receive faxes only on the fax machine. In this case, an incoming non-fax data modem call still needs to be routed to the PC. All modes of operation may be selected by the P.C. by suitable AT command.

Fax machines and fax modems currently available on the market may operate at higher transmission speeds than those previously available. This higher speed may only be utilized if both fax machines involved in a communication session have the higher speed capability. However most of the existing stock of fax machines worldwide do not yet have this capability. Therefore in a further aspect of the current invention, it is proposed to provide a device, which will operate as an accessory to existing fax machines, to thereby provide the higher speed capability.

The advantage to the user is that reduction in fax transmission time will reduce telephone call charges. Remote callers may also receive the same benefit when the machine is used for reception. The device will thereby provide the features available in new fax machines, by upgrading the capabilities of their existing fax machine, at considerably less expense than the purchase of a new fax machine.

Further aspects of the present invention provide that the device may embody additional telephone or local facsimile connections, or may provide additional features in existing connections. These connections may provide, and the device may encompass, the ability to send and receive voice messages as well as data and fax messages. These connections may be implemented either as additional telephone jacks in parallel or by separate connections with additional and separate line interface units. The operation of these connections may be selected by either hardware or software command.

The device may also be adapted for connection to Integrated Services Digital Network (ISDN) telephone lines as well as the usual Public Switched Telephone Network (PSTN). In the use of ISDN for fax, the device may utilize the Group 4 fax standard, providing the buffering and conversion necessary to interface existing fax machines to the ISDN.

The operation of the device, with respect to certain aspects of the present invention will be explained with reference to FIG. 8. In certain embodiments of the invention a ring generate circuit may be included. In the above prior art devices in the aforementioned U.S. patent application, it was necessary to provide for three separate operating modes of the device. In the present invention, only two operating modes need to be provided. These are:

1. PC mode
2. Fax machine mode

Figure 13:
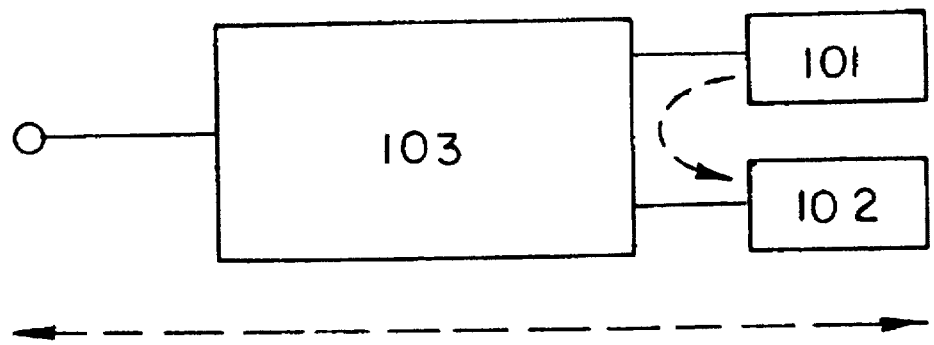
FIG. 13 is a block schematic showing operation in a first mode or computer mode.
Figure 14:
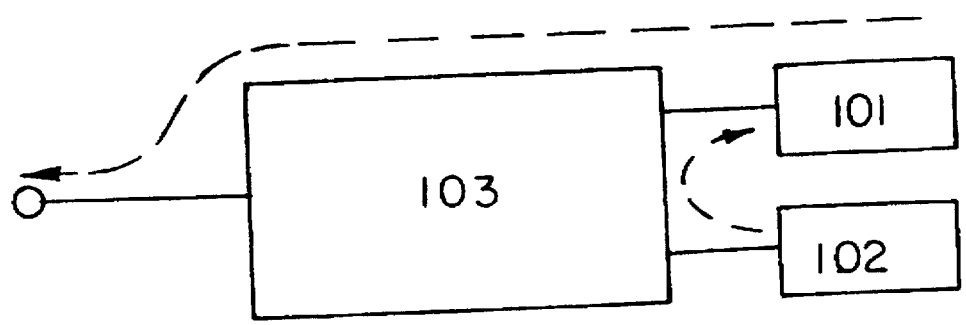
FIG. 14 is a block schematic showing operation in a second mode or facsimile mode.

These modes may be selected by a hardware switch 114 or by an 'AT' command from the PC 102 which will, in turn, activate switch 114. FIGS. 13 and 14 schematically show these modes.

In PC mode all communications with the device 103 involve a modem 119 component in connection with the PC 102 via the serial port or equivalent data bus connection. In this mode, the line selection switch 114 connects the telephone connection of the fax 101 to the modem 119 input in fax machine mode, the PC 102 is isolated from the PSTN telephone line and all communication involves the fax machine 101. In this mode, the line selection switch 114 normally connects the fax machine's telephone connection to the external telephone line PSTN. The fax machine 101 is used normally in this mode.

Unlike prior art devices a third operating mode is not required in order to effect local transfers between the fax machine 101 and the PC 102. In the present invention local transfers are performed merely by operating the fax machine 101 when the device 103 is in PC mode or by sending PC faxes when the device is in fax machine mode. Thus, the operation of the device 103 is simplified for the user, without the need for implementation of an additional local mode of operation to perform local transmissions.

In PC mode, both the external telephone line PSTN and the telephone connector of the fax machine are connected to the modem 119. In this case the switch 114 connects the fax machine to the line interface 117. The line to the fax machine 101 is provided with a line emulation voltage from a line emulation voltage generator 141. When the fax machine 101 is not in use, all communications in this mode take place between the PC 102 and modem 119 connection to the external telephone line PSTN. The PC 102 may thus initiate and receive fax or data calls.

Incoming calls are directed to either the PC 102 or the fax machine 101 according to whether the device is in PC or fax machine mode respectively. In PC mode, calls from the PC 102 are directed to the external PSTN line and calls from the fax 101 are directed to the PC 102. Conversely, in fax machine mode, calls from the PC 102 are directed to the fax 101 and calls from the fax 101 are directed to the external PSTN line.

Operationally if the user activates the fax machine 101 when the device 103 is in PC mode, it is assumed that a local transfer is requested. This is detected by the local fax line interface unit 117, if the handset of the fax machine 202 is lifted, or dialling is attempted, the fax machine 101 will be detected as being off hook. In this case the external telephone line interface unit 118 will be left on hook, and communications will thus proceed between the fax machine 101 and the PC 102 via the modem 119 and serial port. The operation of the device 103 is under the control of the microprocessor 110 of the device.

The fax machine 101 may thus be used in this mode to transmit documents to PC 102. According to the normal operation of fax machines, when the handset is lifted, and the start button is pressed, or the equivalent thereof, the machine will go into transmit or receive mode according to whether there are documents present in the document feeder. In order to ensure that the user intends a transmission from the fax machine the device 103 may monitor the line and determine this from the tones being emitted from the fax machine 101 as part of the fax handshake signalling procedure.

If the fax machine 101 is transmitting, the device 103 will convey a ring signal to the PC, so that the PC 102 software will then prepare to receive a fax. A visible or audible signal may be provided to the fax machine user that a local fax transfer (scan) is being requested.

In fax machine mode the line selection switch 114 normally connects the fax machine mode to the external PSTN line connection to enable the fax machine to send and receive calls. If the PC places a call in fax machine mode, a local transfer (print) is assumed. In this case the line selection switch 114 will temporarily connect the line interface 117 to the fax machine, for the duration of the call.

When the user sends a fax from the PC 102 in fax machine mode, reception may be initiated by the fax machine by the user pressing the start button on the fax machine. If the device 103 is provided with a ring generator (not shown in FIG. 8), this may be used to activate the fax machine 101 for reception of a local transmission without the need to press the start button on the fax machine 101. The device 103 thus utilizes the scanning and printing capabilities of the fax machine 101, in connection to the PC 102, without the provision of a separate mode for this purpose.

Figure 8:
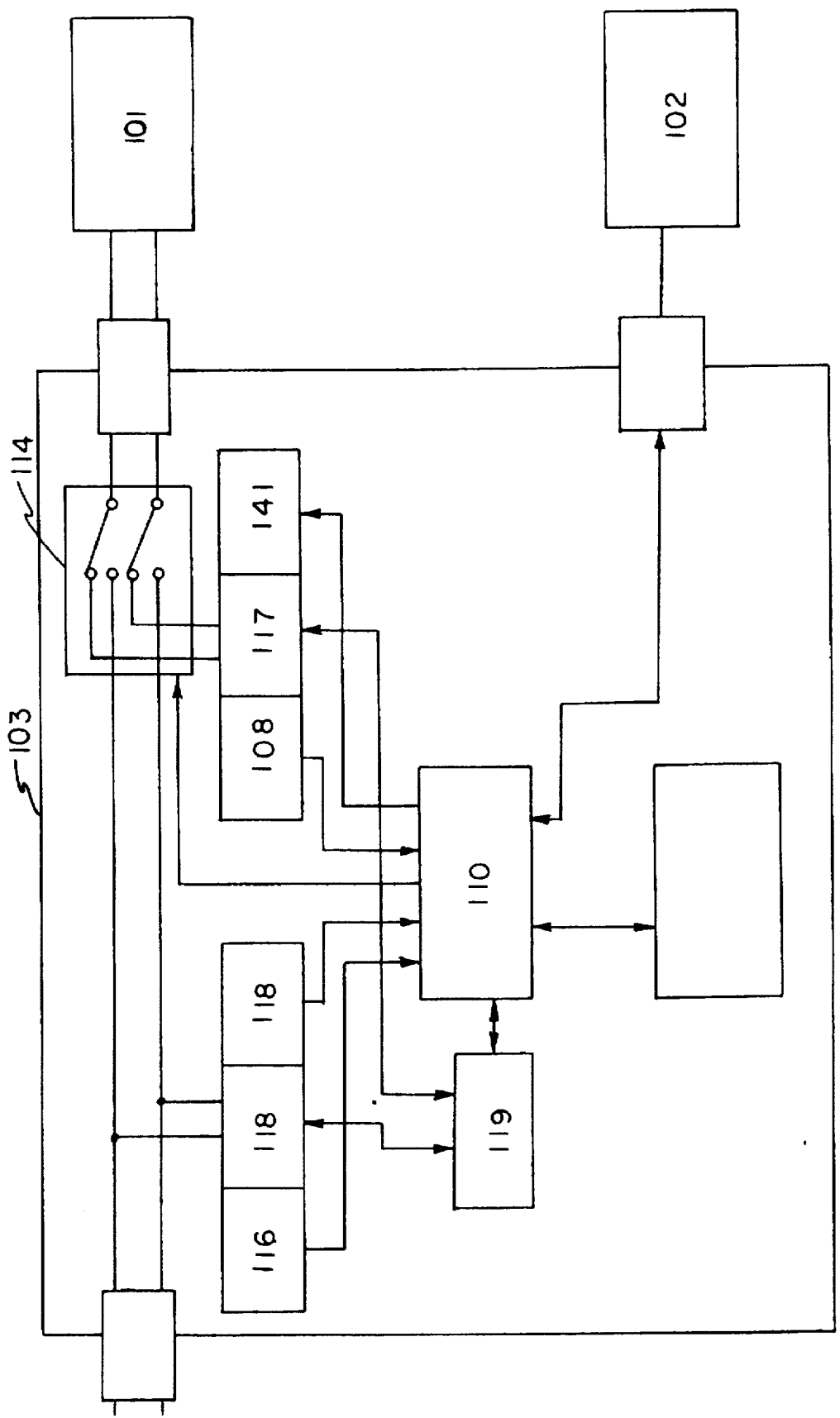
FIG. 8 is a block circuit diagram of an example of a first embodiment.

In a further aspect of the present invention, the device 103 of FIG. 8 may also be provided with the ability to discriminate between incoming fax and data modem calls and route the call to the appropriate device using the switching mechanism. This feature is particularly useful for users who wish to share either fax machine and modem on the one telephone line, so that both may be used for sending faxes, or the PC used for initiating data modem calls. Typically however, the user may wish to receive all faxes on the fax machine. In this case incoming data calls still need to be routed to the PC 102.

In prior art devices it has been possible to discriminate between data and fax calls, and notify the PC 102 of the call type so that the appropriate PC software may be activated for reception. In the case of a facsimile call which may contain standard fax as well as fax Binary File transfer (BFT) data, it has been possible to selectively route the standard fax component to the fax machine and the BFT component to the PC 102.

In other prior art devices it has been possible to selectively route fax and modem calls, but this has required a device with two modem components and a ring generate circuit and has not been provided as a function which is user selectable via hardware switch or software "AT" command.

According to the present invention, a further operating mode of the device is provided, this being an auto-detect or auto-route mode, whereby it is possible to automatically route incoming non facsimile data calls to the PC 102 and fax calls to the fax machine 101. This is accomplished by monitoring the tone signals of the incoming call. If the fax calling tone is detected, a fax call is assumed, and the call is routed to the fax machine 101, otherwise the call is routed to the PC 102. This task is performed by the microprocessor 110 of the device 103.

If the call is to be routed to the PC 102, the device 103 issues a ring indicate signal to the PC 102. In a particular embodiment of the device 103, which contains a ring generate circuit (not shown in FIG. 8) if the call is to be routed to the fax machine, the device 103 generates a ring to the fax machine 101, which answers, whereupon the call is passed to the fax machine 101.

In this embodiment, the switch 114 is used to firstly connect the fax machine to the modem input line interface 117. After the fax machine answers the ring signal, under the control of the microprocessor 110, the fax machine is switched via switch 114 to connect directly to the external PSTN line. In this case signals do not pass through the modem as in prior art devices.

In embodiments of the invention which do not contain a ring generate circuit, it is still possible to automatically route a fax call to the fax machine 101, without the need for operator intervention, i.e. manually receiving the call and pressing the start button. This may be achieved in the following manner.

When the device 103 is in auto-route mode, the ring signal from the telephone exchange due to an incoming call will be passed directly to the fax machine 101 via switch 114. When the fax machine 101 answers the call, it will go to receive mode answering procedure for approximately 30 seconds. During this time the device 103 will monitor the external line PSTN, for the fax calling tone. If the fax calling tone is detected, the call to the fax machine 101 will be allowed to proceed. If the fax calling tone is not detected, the device 103 will hold the call, terminate the connection to the fax machine 101 via switch 114 and assume the call is a data call. The device 103 will then issue a ring indicate condition by an AT command 102 to the PC 102, and pass the call to the PC 102 for reception by the PC 102 communication software.

The local line loop detector 108, ring detector 116 and line loop detector 118 otherwise operate in the same way as described in the aforementioned U.S. patent application.

In all line selection procedures, the device may first determine that the external or local line is not in use before implementing a PC or user command to select a line. In this way inadvertent call interference may be prevented.

Figure 9:
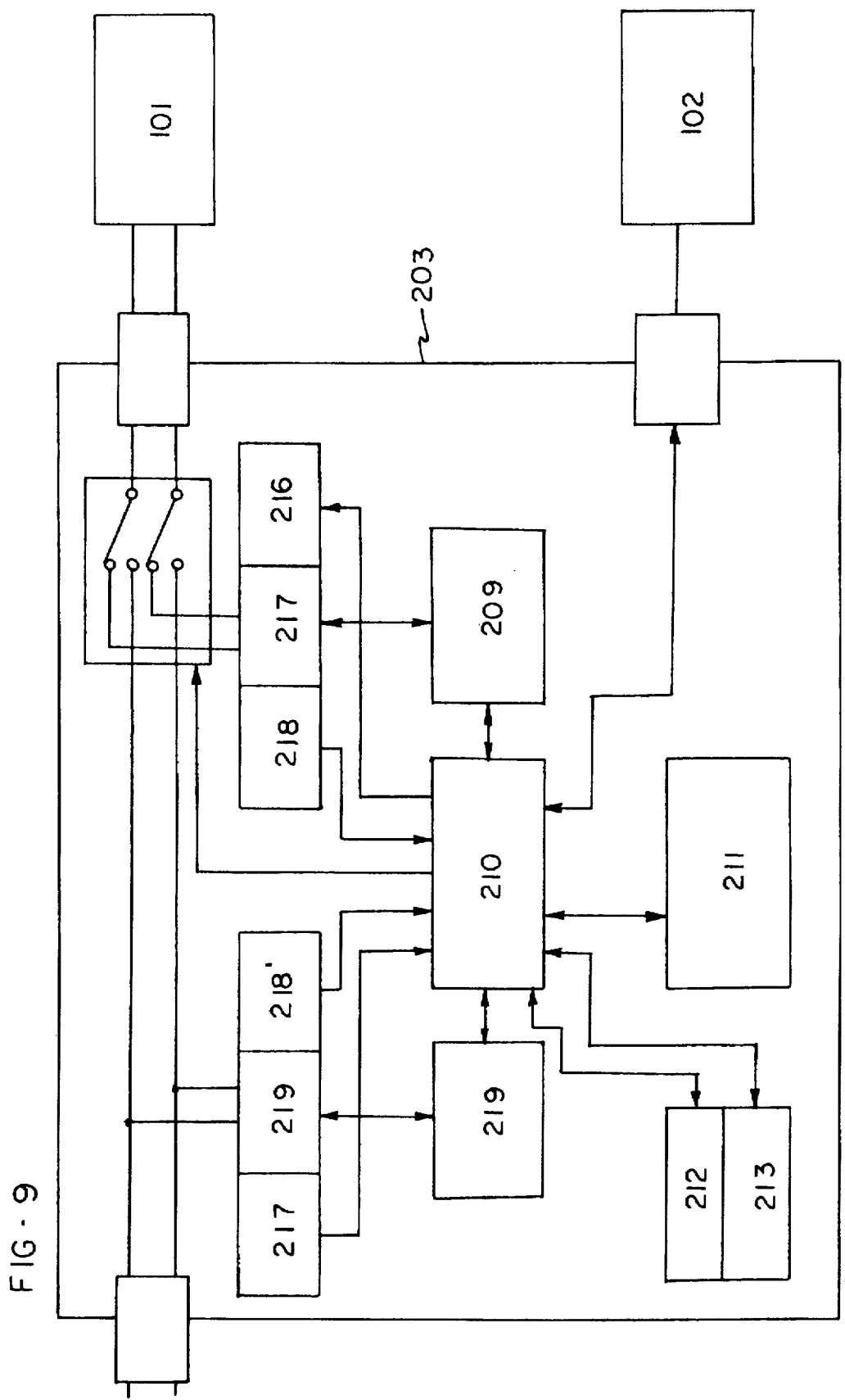
FIG. 9 is a block circuit diagram of an example of a second embodiment.

The operation of another embodiment of the present invention which provides for an enhanced mode of operation may be described with reference to FIG. 9. The present embodiment differs from the prior art in the function and purpose of some of the components. The physical configuration of the device 103 differs from that of the in the aforementioned U.S. patent application prior art. This device preferably contains two modem components 209/219, as well as preferably containing a user interface 213 and a display 212. These latter components will provide a means of manual initiation of remote transmission, and of monitoring call progress.

The method of operation of the device 203 is to buffer and store the fax data where appropriate so as to minimise the telephone line connection time. The operation for transmission differs somewhat from that of reception. The selection of this mode of operation may be via PC command or via the user interface.

Figure 10:
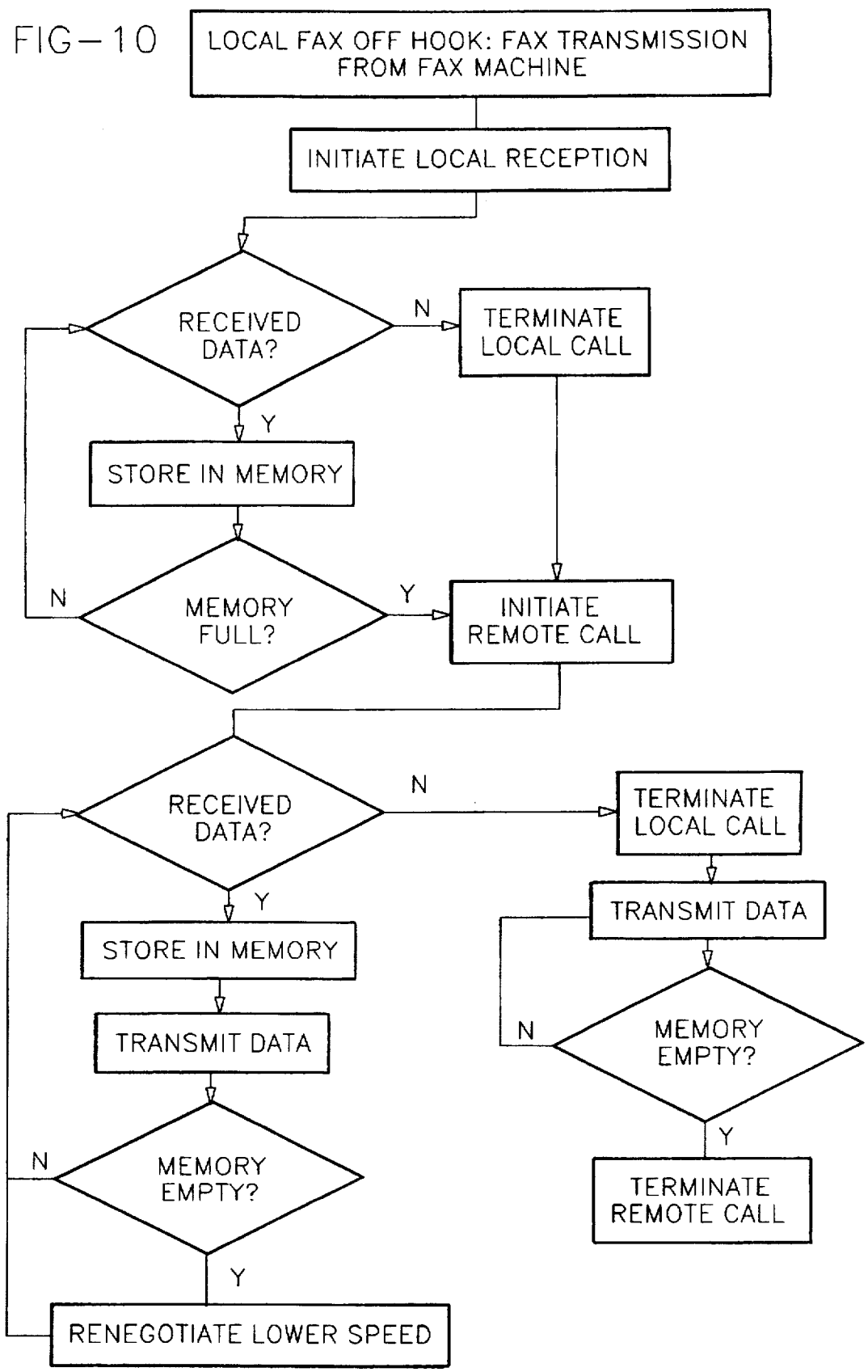
FIG. 10 is a flow diagram of the operation of the embodiment of FIG. 9 in a transmission mode.

The operation of the device 203 in terms of fax transmission will be described first. In this case, the operation of the device 203 is depicted in FIG. 10. When the fax machine 201 initiates a call, the local connection to the fax machine will first go off hook. This will be detected by the local connection line interface unit 217. At this time, the device 203 will perform the required fax signalling handshake procedure in order to initiate the reception of the fax data. This will occur via the local interface modem 209 component, which have standard speed capability in line with existing fax machines.

The received fax data will at this time be stored in system memory 211, which may consist of random access memory or other mass storage means. At the appropriate time, the call to the remote fax machine will be initiated. The number to call may be determined from the tones the user has previously dialled on the fax machine, and stored for later use by the device. The fax data stored in memory 211 will then begin to be transmitted to the remote fax via the remote line modem 219 component, which will preferably be capable of the highest speed currently available for fax transmission.

This process of simultaneous reception and retransmission at high speed will continue until the fax transmission is completed.

The time at which the remote call is placed will be delayed for as long as possible, in order to minimise remote call duration. This remote call placement procedure will commence either when the local transmission is complete, or when system memory available is approaching capacity, or when the call is initiated via the user interface. The user may select that remote dialling automatically commence after any given amount of information has been pre-loaded into the system memory 211. The delayed dialling performed by the device 203 will automatically replicate the number dialled by the fax machine, or may be operated manually.

In the event that the remote machine is busy or unavailable the local fax session will terminate. The user will be given the option of retaining the existing information in memory and recommencing the procedure when the remote station is available, or of repeating the complete procedure at a later time.

The user display of the device may inform the user of the current status of operations, such as the phone number of a pending transmission, and the number of pages. The device may optionally transmit journal information back to the fax machine in the form of a special fax transmission to indicate the success or failure of an operation.

If during transmission, the amount of fax data information in the system memory 211 falls below a required minimum the device 203 will re-negotiate the transmission speed with the remote fax machine, so that the transmission speed is the same as the local transmission speed, thus averting a memory under flow condition.

The local ring generator 216, local line loop detector 218, and line loop detector 218 and ring detector 217 and line interface unit 219 operate in the same manner as described in the prior U.S. patent application.

Figure 11:
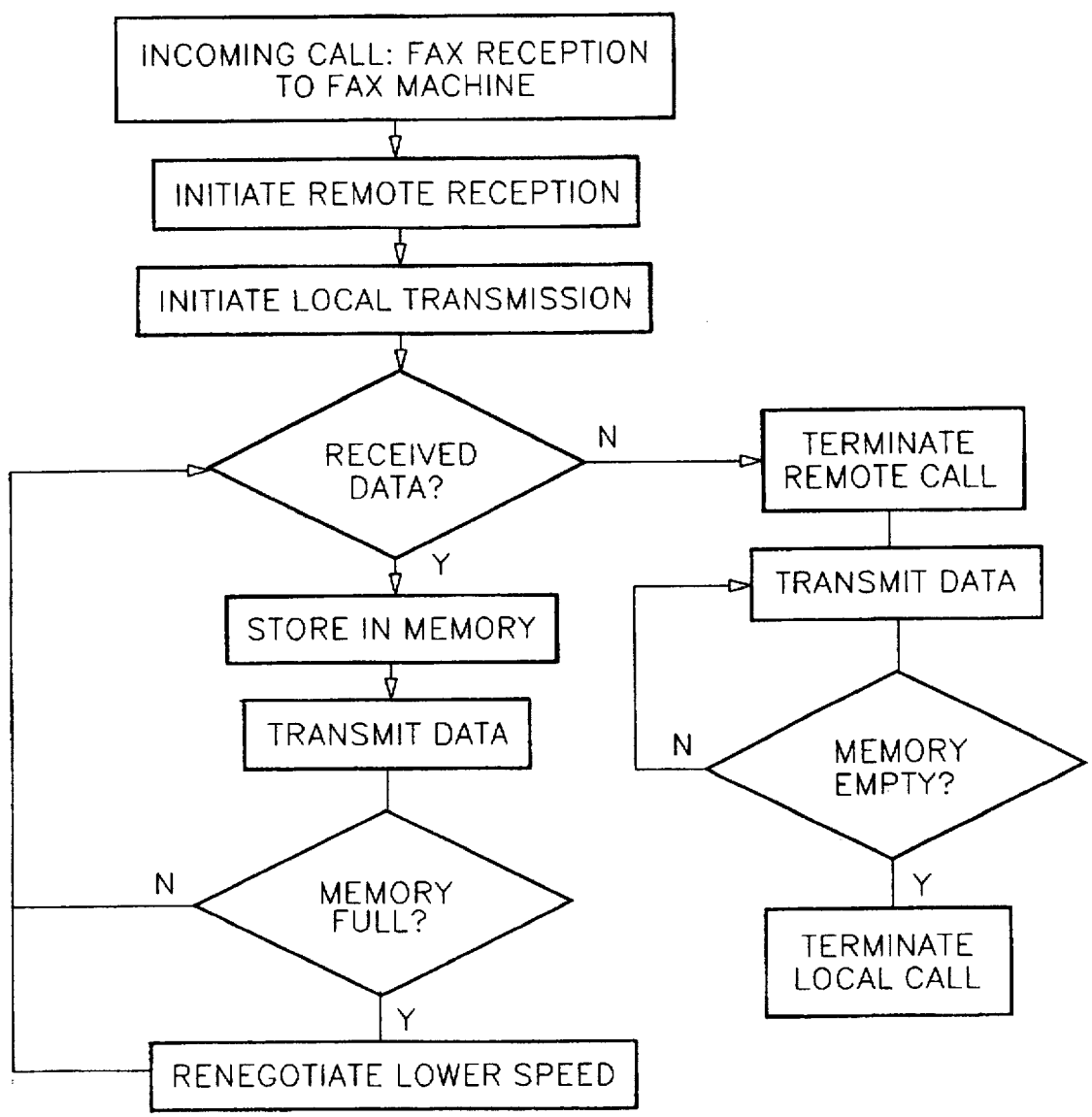
FIG. 11 is a flow diagram of the operation of the embodiment of FIG. 9 in a receiving mode.

The operation of the call acceleration function of device 203 in terms of reception will now be described. In this case, the operation of the device is depicted in FIG. 11. During reception the device 203 will initiate the local call procedure at the same time as initiating procedures for the incoming remote fax. In this case the device 203 will receive data at the highest speed possible, storing data in system memory, while relaying the information at a lower speed to the local fax machine 201. This procedure will continue until the incoming transmission is completed, whereupon the telephone call will be terminated. Meanwhile relayed transmission to the local fax machine 201 will continue until it is completed.

If during reception, the system memory approaches capacity, the device 203 will re-negotiate the transmission speed with the remote fax machine, so that the reception speed is the same as the relayed transmission speed, thus averting a memory overflow condition.

The device 203 may be designed so that additional memory capacity can be easily installed by the user, in similar fashion to personal computers. In the case of units which embody a disk drive, a disk so installed may also be used as a temporary storage means.

In both cases where buffered local transmission is taking place either prior to or after the completion of the remote transmission, the device 203 will disable or otherwise not answer incoming calls while a local download to the fax machine is occurring, however, the PC will be able to make or receive calls.

Data throughput over the telephone line is often limited by the minimum scan line time capability of either the local or remote fax machine. A further advantage of the device is that in operating directly from memory, it may provide the fastest apparent printing and scanning ability, thus always using to the maximum, the ability of the local or remote fax machine to which it is connected.

While the buffered retransmission operation of the device 203 is primarily designed to implement a higher speed capability in association with an existing standard speed fax machine, it is also intended that the device 203 be used in other situations where a store-and-forward operation would be useful in implementing other advanced fax capabilities. These include higher resolution, file transfer, and the optional capture and storage of such non-standard or high order information for later transfer to the PC 202.

Figure 12:
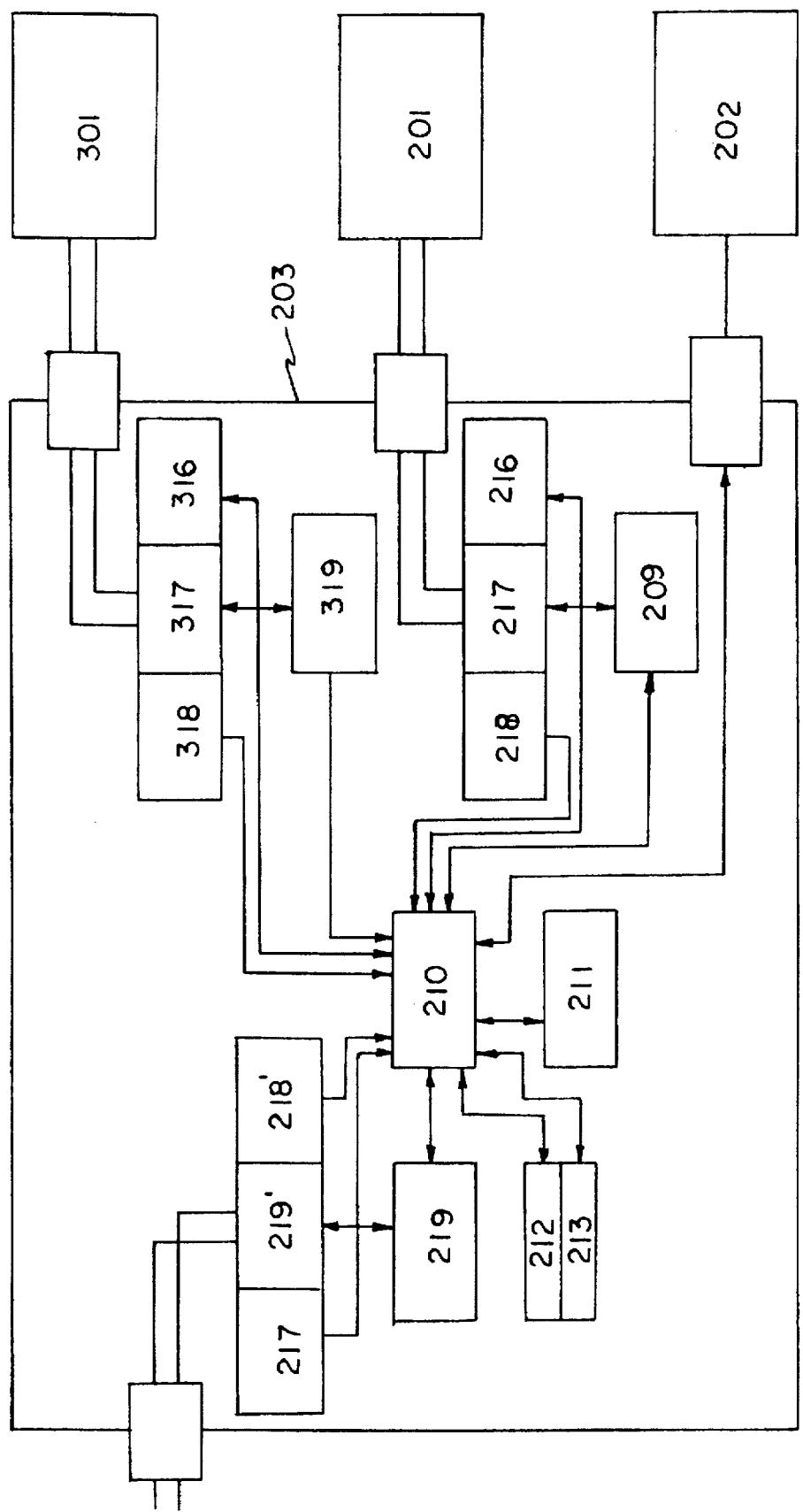
FIG. 12 is a block circuit diagram of an example of a further embodiment.

As previously noted, further modifications to the device, to include additional phone line connections, are to be considered as part of the current invention. One such further embodiment is depicted in FIG. 12 showing a further facsimile connection. In this case additional line interface unit 317, and modem 309, line loop detector 318, ring generate circuit 316 components have been included so that a second local fax machine 301 may be connected to the device 203. The particular advantage of this configuration is that maximum use of the telephone line may be attained, with the possibility of both fax machines 301, 201 operating simultaneously. After a fax has been received and a local download to the fax machine is in operation, the external telephone line will become free. During this time the line may be used by the other fax machine or the PC, for the further fax operations. The device 203 may thus effectively multiplex a plurality of devices to the line, for simultaneous operation.

The control of the device and the selection of operating modes is by the computer or via the user interface keypad. In this case, for operations which require a local fax transfer, the user selects which fax machine is to be used for the scan or print operation.

It will be obvious to those skilled in the art that numerous alterations and modifications can be made to the devices encompassing the invention other than those specifically described above without departing from the basic concepts of the invention.

All such modifications and alterations are to be considered within the scope of the invention, the nature of which is to be determined from the foregoing description.

I claim:

1. A modem device for communication of facsimile data or binary file data between a facsimile transceiver and a computer, and/or a remote telephone exchange, control means for controlling communication of said data, said control means including a microprocessor, first termination means for local connection to a facsimile transceiver, second termination means for local connection to a computer, third termination means for local connection to a remote telephone exchange; and communication means having modem means for selectively conveying signals between said first termination means, said second termination means and/or said third termination means in accordance with only two possible local user selectable operating modes, said local user operating modes consisting of:

(i) a first operating mode where said facsimile transceiver is connected to an input of said modem via said first termination means and said computer is connected to receive the output of said modem via said second termination means; and (ii) a second operating mode where said computer is isolated from said third termination means and said facsimile transceiver is connected directly to said third termination means, said first operating mode enabling said second termination means and the first termination means to be interconnected via said modem and said second termination means to be connected to said third termination means thereby permitting said computer to connect with said remote telephone exchange and receive incoming facsimile transmissions and also permitting local transfer of facsimile data to the computer when the facsimile transceiver is activated to send a facsimile message, said second operating mode enabling direct straight through reception or transmission of facsimile data with said facsimile transceiver via said first termination means and said third terminations means and wherein a third operating mode is not required to effect local transfers between said first termination means and said second termination means.

2. A modem device as claimed in claim 1 wherein said second mode also permits said computer to connect with said facsimile transceiver to receive a transmission from said computer.

3. A modem device as claimed in claim 1 wherein said control means includes a line voltage emulation generator means to simulate line voltage supplied during communication from said facsimile transceiver, so that if said device is in said first operating mode all communications take place between said second termination means and said third termination means, so said computer can receive or transmit facsimile or binary file data via said remote telephone exchange.

4. A modem device as claimed in claim 1 wherein said control means includes a local facsimile line interface unit and an external facsimile line interface unit, so that if in said first operating mode and said facsimile machine is operated to dial, said local facsimile line interface unit will detect that a local facsimile machine to local computer communication is required, and said external facsimile line interface unit will be in an on hook condition, but when an incoming communication is received at said third termination means said external line interface will permit the facsimile data or binary file data to pass via said modem means to said computer.

5. A modem device as claimed in claim 1 including a ring generator which is activated on a local transmission from said computer to said facsimile transceiver to simulate a ring signal received at said third termination means, whereby to permit said facsimile transceiver to answer the transmission.

6. A modem device as claimed in claim 5 wherein said modem means is configured to recognise a particular code for local transmission from said computer to said facsimile transceiver.

7. A modem device as claimed in claim 1 including a third operating mode where auto routing of incoming transmissions at said third termination means is enabled to monitor at said control means, tone signals of a facsimile transmission and to permit direct straight through connection to said facsimile transceiver if such tone signals are detected and to permit connection to said computer if said tone signals are not detected.

8. A modem device as claimed in claim 1 and having a system memory for buffering facsimile data or binary file data in incoming or outgoing transmissions whereby to isolate said facsimile machine from connection to said third termination means where the communication of facsimile data or binary file data is determined by the speed of the facsimile transceiver which is slower than the fastest possible speed possible in a connected communication session, said microprocessor being adapted to store the incoming or outgoing facsimile data or binary file data in said system memory and to simultaneously retrieve that data from said system memory and to either pass it to said facsimile transceiver at its required speed of operation in the case of an incoming transmission or to pass it to said third termination means following connection being made on said remote telephone exchange to a remotely located facsimile transceiver, said passing being at the fastest possible speed for that connected communication session, whereby to minimise telephone connect time.

9. A modem device as claimed in claim 8 wherein said microprocessor is programmed so that during reception of an incoming transmission it will activate a ring generate means in said control means to provide a ring signal to said facsimile transceiver via said third termination means to cause said facsimile transceiver to start receiving the data in said system memory.

10. A modem device as claimed in claim 9 wherein said microprocessor is programmed to re-negotiate transmission speed with the remote facsimile transceiver or computer, if it senses the system memory is approaching capacity whereby to slow the incoming transmission of data to said system memory.

11. A modem device as claimed in claim 8 wherein said microprocessor is programmed so that during an outgoing transmission signalled by initiating a transmission at said facsimile transceiver at said third termination means, and whilst facsimile data is being loaded into said system memory, it will activate signals for a connection with a remote facsimile via said third termination means, and utilize a remote modem means at said device, said remote modem means having a capability for transmission of facsimile data or binary file data at a faster rate than said facsimile machine connected at said first termination means.

12. A device for connection with an existing facsimile transceiver which has a slower data transmission or reception rate than a remote but interconnected facsimile transceiver, said device comprising a microprocessor and a system memory said microprocessor being configured and programmed so that on activation of an outgoing transmission from said facsimile transceiver to load the facsimile transmission data into said system memory and to subsequently but simultaneously whilst loading said facsimile transmission data make connection with said remote facsimile transceiver and to effect transmission of the stored facsimile data at a fastest possible rate compatible with said remote facsimile transceiver and during reception of an incoming facsimile transmission from said remote facsimile transceiver to direct the incoming facsimile data to said system memory at a fastest possible speed compatible with said remote facsimile transceiver and to then permit transfer of that stored facsimile data to said facsimile transceiver at the fastest possible speed compatible with said facsimile transceiver.

13. A device as claimed in claim 12 constructed so as to permit connection of a second facsimile transceiver, said microprocessor and system memory being configured and programmed to permit facsimile communication with a remote but interconnected facsimile transceiver at the same time as received facsimile data is being relodged from said system memory to either said existing facsimile transceiver or said second facsimile transceiver, said facsimile communication being with which ever of the existing facsimile transceiver or second facsimile transceivers is not being used to receive said received facsimile data.

14. A device as claimed in claim 13 wherein the one of the facsimile transceivers that is transmitting outgoing facsimile data whilst the other is receiving facsimile data from system memory, is connected via said microprocessor to load the outgoing facsimile data into said system memory, and subsequently but simultaneously whilst loading said facsimile transmission data make connection with said remote facsimile transceiver and to effect transmission of that loaded facsimile data at the fastest possible rate compatible with said remote facsimile transceiver.

15. A modem device for connection with a facsimile transceiver and a computer and with a telephone network, said modem device having control means for controlling data therebetween, said control means including microprocessor means responsive to "AT" commands from said computer to place said modem device into one of only two possible local user selectable modes of operation selected from the group consisting of:
 1. a computer mode in which said computer can communicate with said facsimile transceiver and also where said computer can communicate with said telephone network to receive or send data.
 2. a facsimile mode in which the facsimile transceiver can receive calls from said computer and can communicate with said telephone network to send or receive facsimile data.

16. A device as claimed in claim 15 wherein said microprocessor is further responsive to an "AT" command to place said modem device into an operating mode to receive incoming calls and to analyse those calls to determine if they are facsimile data type calls or data modem type calls and to automatically answer those calls in the appropriate mode for those respective type calls and to transfer a call to the facsimile transceiver or the computer in accordance with the type determined.

17. A modem device as claimed in claim 15 wherein said control means includes two internal modems, one being a local modem for permitting data connection between the facsimile transceiver and the computer and the other modem being for permitting data connection between said telephone network, said other modem permitting enhanced data transmission on said telephone network than possible via said facsimile transceiver, said control means including buffer means under control of said microprocessor means to buffer data between said facsimile transceiver and said telephone network so that data can be transmitted therebetween in a less enhanced mode, than possible between said buffer means and said telephone network.

18. A modem device as claimed in claim 17 wherein said control means is configured for an incoming call to receive said data into said buffer and subsequently but simultaneously retrieve that data from said buffer and pass it to said facsimile transceiver, and to maintain continuity between all the data communications.

19. A modem device as claimed in claim 17 wherein said control means is configured for an outgoing call to receive said data into said buffer and subsequently but simultaneously retrieve that data from said buffer and pass it to said telephone network, and to maintain continuity between all the data communications.

* * * * *